(12) United States Patent
Goto

(10) Patent No.: US 9,938,762 B2
(45) Date of Patent: Apr. 10, 2018

(54) VEHICLE WITH TAILGATE

(71) Applicant: HONDA MOTOR CO., LTD., Tokyo (JP)

(72) Inventor: Taisuke Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 18 days.

(21) Appl. No.: 15/108,144

(22) PCT Filed: Dec. 16, 2014

(86) PCT No.: PCT/JP2014/083230
§ 371 (c)(1),
(2) Date: Jun. 24, 2016

(87) PCT Pub. No.: WO2015/098618
PCT Pub. Date: Jul. 2, 2015

(65) Prior Publication Data
US 2016/0319585 A1 Nov. 3, 2016

(30) Foreign Application Priority Data
Dec. 27, 2013 (JP) .................................. 2013-272755

(51) Int. Cl.
*B62D 35/00* (2006.01)
*E06B 3/50* (2006.01)
(Continued)

(52) U.S. Cl.
CPC ................. *E06B 3/50* (2013.01); *B60J 5/101* (2013.01); *B60J 5/105* (2013.01); *E05B 81/04* (2013.01); *E05B 81/06* (2013.01); *E05B 83/20* (2013.01)

(58) Field of Classification Search
CPC ... E06B 3/50; B60J 5/101; B60J 5/105; E05B 81/04; E05B 81/06; E05B 83/20
See application file for complete search history.

(56) References Cited

U.S. PATENT DOCUMENTS 6,017,067 A * 1/2000 Yoneyama .............. E05B 83/16
292/216
6,123,386 A 9/2000 Montone et al.
(Continued)

FOREIGN PATENT DOCUMENTS

EP 1 386 767 A1 2/2004
EP 2386435 11/2011
(Continued)

OTHER PUBLICATIONS

Japanese Office Action dated May 30, 2017, 3 pages.
International Search Report, dated Jan. 27, 2015 (Jan. 27, 2015).
European Search Report dated Aug. 28, 2017, 54 pages.

Primary Examiner — Lori L Lyjak
(74) Attorney, Agent, or Firm — Rankin, Hill & Clark LLP

(57) ABSTRACT

In a vehicle with a tailgate, a rear opening is formed in a rear surface of a vehicle body, a tailgate that is provided to open and close the rear opening, a sub-door opening that is formed in a portion of the tailgate in a width direction, and a sub-door that is provided to open and close the sub-door opening. The vehicle includes a tailgate latch device that locks the tailgate with the vehicle body, a sub-door latch device that locks the sub-door with the vehicle body, and a control unit that controls the tailgate latch device and the sub-door latch device. The control unit controls the sub-door latch device so as to prohibit the sub-door from being opened when determining that the tailgate is opened.

10 Claims, 8 Drawing Sheets

(51) Int. Cl.
    *B60J 5/10*          (2006.01)
    *E05B 83/20*       (2014.01)
    *E05B 81/06*       (2014.01)
    *E05B 81/04*       (2014.01)

(56) References Cited

U.S. PATENT DOCUMENTS

| | | | |
|---|---|---|---|
| 9,669,687 B2 * | 6/2017 | Yamaguchi | B60J 5/102 |
| 9,669,688 B2 * | 6/2017 | Yamaguchi | B60J 5/103 |
| 2002/0158473 A1 * | 10/2002 | Ogino | F03B 17/061 |
| | | | 290/43 |
| 2016/0039273 A1 * | 2/2016 | Yamaguchi | B60J 5/105 |
| | | | 296/146.8 |
| 2016/0114768 A1 * | 4/2016 | Matsuura | B60S 1/583 |
| | | | 296/146.2 |

FOREIGN PATENT DOCUMENTS

| | | | | |
|---|---|---|---|---|
| EP | 3012136 A1 * | 4/2016 | | B60J 1/18 |
| EP | 3012137 A1 * | 4/2016 | | B60J 5/103 |
| JP | H01-163673 U | 11/1989 | | |
| JP | 6-25584 | 7/1994 | | |
| JP | UM-Y-2514650 | 8/1996 | | |
| JP | 11131885 | 5/1999 | | |
| JP | 2002-295098 | 10/2002 | | |
| JP | 2009-281004 | 12/2009 | | |
| JP | 2014012445 A * | 1/2014 | | B60J 5/101 |
| WO | WO-2015098611 A1 * | 7/2015 | | E05D 15/52 |

\* cited by examiner

VEHICLE WITH TAILGATE

TECHNICAL FIELD

The present invention relates to a vehicle with a tailgate in which the tailgate is provided to a rear surface of a vehicle body.

BACKGROUND ART

Patent Document 1 discloses technique related to a vehicle having a tailgate provided to a rear surface of a vehicle body.

In the vehicle disclosed in Patent Document 1, a rear opening is formed in the rear surface of the vehicle body, and the tailgate is provided to open and close the rear opening. A second opening is formed in the tailgate, and sub-doors are provided to open and close the second opening.

The sub-doors are so-called double doors. Two sub-doors are supported individually on the tailgate via a link mechanism and are opened from a vehicle width center respectively to the outside so as to move away from each other. Handles are mounted at the vehicle width center of the sub-doors, and an operator operates the sub-doors to open or close them by grabbing the handles.

However, when the operator opens or closes the tailgate by grabbing the handles provided on the sub-doors, the following problem will be caused. Namely, when opening the tailgate, the operator pulls the handles to the rear and upwards. At this time, if the operator erroneously exerts a force in the left-right direction, there are fears that the sub-doors are also opened while the tailgate is being opened.

PRIOR ART DOCUMENT

Patent Document

Patent Document 1: Japanese Utility Model Registration Publication No. 2,514,650

SUMMARY OF THE INVENTION

Problem to be Solved

The object of the present invention is to provide, for a tailgate having a sub-door mounted therein, a technique of accurately opening and closing respective doors.

Means for Solving the Problem

According to an aspect of the present invention, there is provided a vehicle with a tailgate in which a rear opening is formed in a rear surface of a vehicle body, a tailgate is provided to open and close the rear opening, a sub-door opening is formed in a portion of the tailgate in a width direction, and a sub-door is provided to open and close the sub-door opening, the vehicle comprising:
 a tailgate latch device configured to lock the tailgate with the vehicle body;
 a sub-door latch device configured to lock the sub-door with the vehicle body; and
 a control unit configured to control the tailgate latch device and the sub-door latch device,
 wherein the control unit is configured to control the tailgate latch device so as to prohibit the tailgate from being opened when determining that the sub-door is opened.

According to another aspect of the invention, there is provided A vehicle with a tailgate in which a rear opening is formed in a rear surface of a vehicle body, a tailgate is provided to open and close the rear opening, a sub-door opening is formed in a portion of the tailgate in a width direction, and a sub-door is provided to open and close the sub-door opening, the vehicle comprising:
 a tailgate latch device configured to lock the tailgate with the vehicle body;
 a sub-door latch device configured to lock the sub-door with the vehicle body; and
 a control unit configured to control the tailgate latch device and the sub-door latch device,
 wherein the control unit is configured to control the sub-door latch device so as to prohibit the sub-door from being opened when determining that the tailgate is opened.

It is preferable that an electrically unlockable latch device is adopted for each of the tailgate latch device and the sub-door latch device.

It is preferable that at least one of the tailgate latch device and the sub-door latch device is a mechanical latch device,
 a latch of the one of the latch device is connected with a handle with which an opening operation is performed via a connecting member,
 the latch device includes a lock device which can unlock the connecting of the connecting member with the latch,
 the lock device is controlled by the control unit to be in either of a locking state and an unlocking state, and
 the control unit locks one of the tailgate or the sub-door when the other of the tailgate or the sub-door is opened.

It is preferable that the control unit is configured to determine that the sub-door is closed when the sub-door is in a half-latched state.

It is preferable that the control unit is configured to determine that the tailgate is opened when the tailgate is in a half-latched state.

Effects of the Invention

According to the one aspect of the present invention, the control unit controls the tailgate latch device so as to prohibit the tailgate from being opened when determining that the sub-door is opened. Accordingly, the sub-door is prevented from being opened at the same time, when the tailgate is opened. Thus, the vehicle can accurately control the operation of the doors.

According to the other aspect of the present invention, the control unit controls the sub-door latch device so as to prohibit the sub-door from being opened when determining that the tailgate is opened. Accordingly, the tailgate is prevented from being opened at the same time, when the sub-door is opened. Thus, the vehicle can accurately control the operation of the doors.

Further, in the present invention, the tailgate latch device and the sub-door latch device each include the electrically unlockable latch device. The opening of the tailgate and the sub-door can easily be prohibited through a control to prohibit the operation of motors for electrically unlockable latches. This can make the configuration simple, thereby making it possible to reduce the production costs.

Further, in the present invention, the control unit controls the lock device so as to lock one of the tailgate or the sub-door when the other of the tailgate or the sub-door is opened. In the case of the mechanical latch device, by activating the lock device that is originally needed to release the operation force from the handle device into the locking side, the operation of the other of the tailgate or the sub-door can be prohibited without adding another mechanism (device) newly, thereby making it possible to prevent an increase in the production costs.

Further, in the present invention, the control unit determines that the sub-door is closed when the sub-door is in the half-latched state. When the tailgate is opened, a force is exerted on the sub-door in a direction in which the sub-door is closed by its own weight. Permitting the tailgate to be opened by regarding the sub-door as being in a closed state expands conditions under which the tailgate is opened, and this improves the operability of the tailgate.

Further, in the present invention, the control unit determines that the tailgate is opened when the tailgate is in the half-latched state. When the sub-door is operated to be opened, a force is also exerted on the tailgate in a direction in which the tailgate is opened. Prohibiting the sub-door from being opened by regarding the half-latched state as an opened state prevents the tailgate from being opened in an ensured fashion.

DETAILED DESCRIPTION OF EMBODIMENTS

Figure 1:
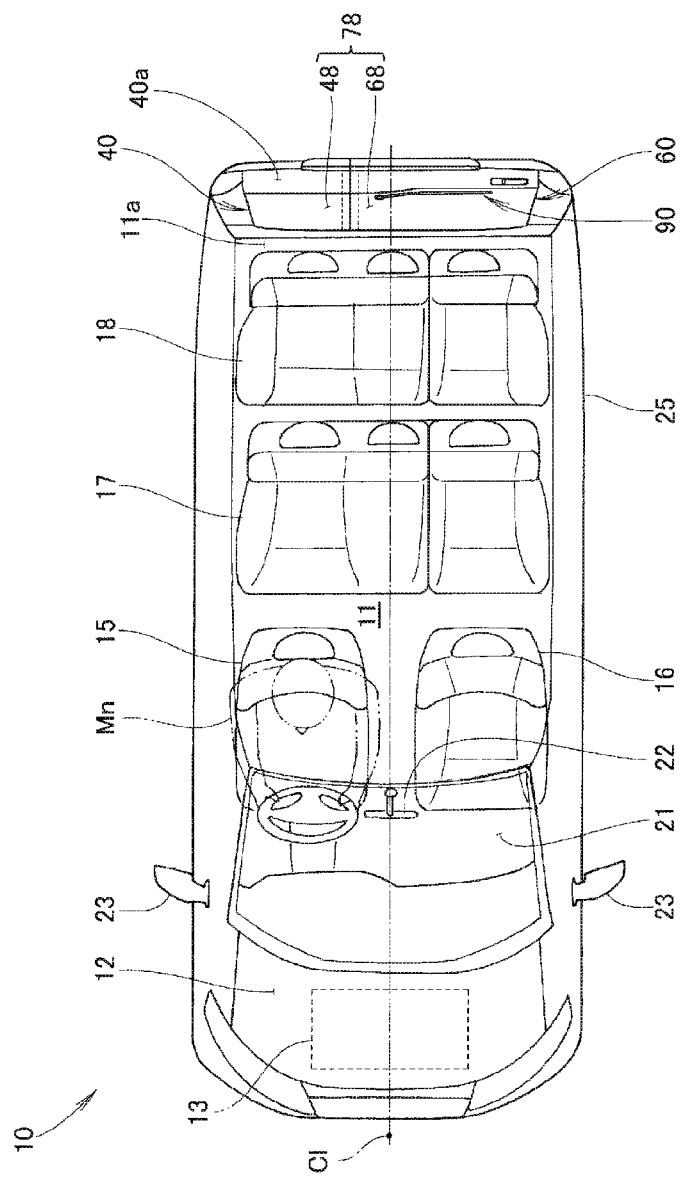
FIG. 1 is a perspective view of a vehicle according to Embodiment 1 of the present invention as viewed from above.

Embodiments of the present invention will be described based on the accompanying drawings. When referred to in the following description, "left" and "right" denote, respectively, the left and right of an occupant of a vehicle, and "front" and "rear" denote, respectively, front and rear in relation to a traveling direction of the vehicle. In the drawings, Fr denotes front, and Rr denotes rear. L denotes the left of the occupant, and R denotes the right of the occupant. Up denotes up, and Dn denotes down.

Embodiment 1

A vehicle according to Embodiment 1 will be described.

FIG. 1 shows a right-hand drive station wagon as an example of a vehicle 10. In the vehicle 10, an engine compartment 12 is formed at the front of a passenger compartment 11, and an engine 13 as a driving power source is mounted in the engine compartment 12. Three rows of seats in which occupants are seated are provided inside the passenger compartment 11.

A driver's seat 15 is provided on a right side of a front portion of the passenger compartment 11, and a front passenger's seat 16 (another seat 16) is provided adjacent to the driver's seat 15. A center line C1 that passes a vehicle width center to extend in a front-rear direction is situated between the driver's seat 15 and the front passenger's seat 16. Namely, the driver's seat 15 is disposed in a position that is offset to the right with respect to the vehicle width center C1, and the front passenger's seat 16 is disposed in a position that is offset to the left with respect to the vehicle width center C1. Hereinafter, a right side of the vehicle will be referred to as a "driver's seat side" and a left side of the vehicle will be referred to as a "front passenger's seat side" as required. Namely, in this embodiment, the driver's seat side can be referred to as the right side of the vehicle, and the front passenger's seat side can be referred to as the left side of the vehicle. When looking at the vehicle 10 from a side thereof, the driver's seat 15 and the front passenger's seat 16 overlap each other, and hence, these front seats will be referred to as a first row seat as a whole as required.

A second row seat 17 in which three occupants can be seated is provided behind the driver's seat 15 and the front passenger's seat 16 (the first row seats 15, 16) so as to extend along a vehicle width direction. A third row seat 18 in which three occupant can be seated is provided behind the second row seat 17 (the middle row seat 17) so as to extend along the vehicle width direction. The second row seat 17 is configured as a single bench seat by providing two seats continuously in the vehicle width direction. The two seats of the second row seat 17 are each configured to be foldable.

The configuration of the third row seat 18 is similar to that of the second row seat 17, and hence, the detailed description thereof will be omitted here. A luggage compartment 11a for storing luggage is formed at a rear end portion of the passenger compartment 11, that is, a portion behind the third row seat 18.

An inside rearview mirror 22 is mounted at a vehicle width center of an upper portion of a windshield 21 for an occupant Mn to obtain a rearward view. Additionally, side mirrors 23,23 are mounted at left and right end portion of a front portion of a vehicle body 25 for the occupant to obtain sideward and rearward views. The vehicle 10 will be described in greater detail based on FIGS. 2 and 3.

Figure 2:
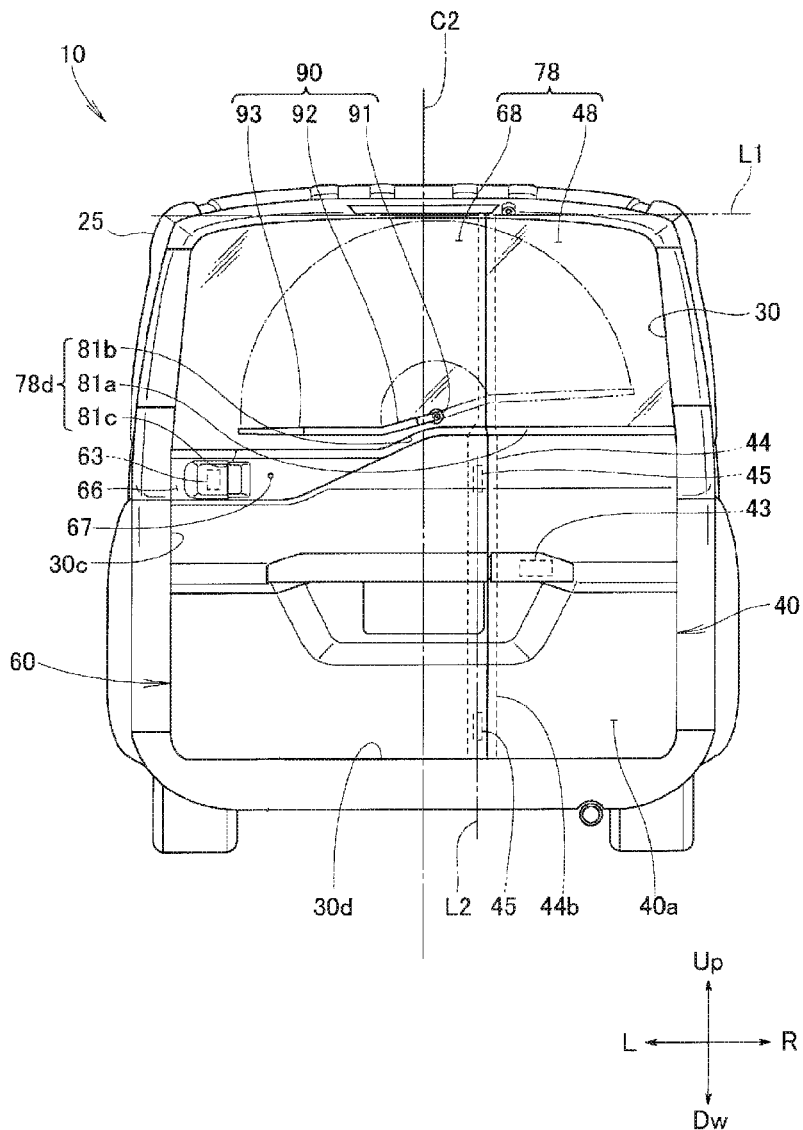
FIG. 2 is a rear view of the vehicle shown in FIG. 1.
Figure 3:
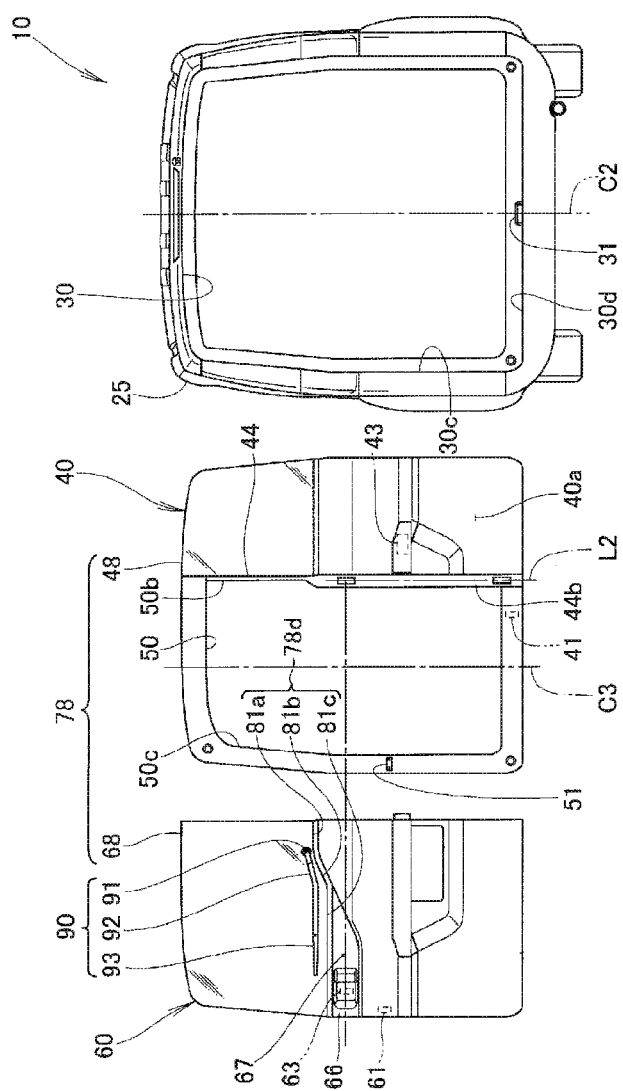
FIG. 3 is an exploded view of the vehicle shown in FIG. 2.

As shown in FIGS. 2 and 3, a rear opening 30 is formed at a rear end of the vehicle body 25 so as to expand fully along the vehicle width direction and the up-down direction. A tailgate 40 is mounted so as to open and close the rear opening portion 30. In a closed state, a part of the tailgate 40 forms a rear surface of the vehicle.

A sub-door opening 50 (a door opening 50 or a gate opening 50) is formed in a vehicle width portion of the tailgate 40 so as to expand fully in the height direction of the tailgate 40. The sub-door opening 50 is an opening that is formed for an occupant to get on and off the vehicle and is formed so as to expand from an end portion of the vehicle 10 on the front passenger's seat side to a position that lies beyond the vehicle width center (refer to a center line CL2 extending vertically at the vehicle width center). A sub-door 60 (a door 60 or a gate sub-door 60) is mounted in the sub-door opening 50 so as to open and close the sub-door opening 50. When the tailgate 40 and the sub-door 60 are in a closed state, the sub-door 60 forms a part of the rear surface of the vehicle 10.

Hereinafter, the "center line C2 that extends vertically at the vehicle width center" will be referred to as a "vehicle width center C2," as required.

A rear window panel 78 is disposed on the rear surface of the vehicle 10 so as to expand along the vehicle width direction. The rear window panel 78 is configured by a tailgate side window panel 48 that is fixed to the tailgate 40 and a sub-door side window panel 68 that is fixed to the sub-door 60. The tailgate side window panel 48 and the sub-door side window panel 68 are provided continuously along the vehicle width direction. A rear surface of the tailgate side window panel 48 and a rear surface of the sub-door side window panel 68 are disposed so as to be substantially flush with each other.

Here, the expression of "substantially flush" includes a case where the rear surface of the tailgate side window panel 48 and the sub-door side window panel 68 are formed continuously and the window panels 48, 68 are both formed into a curved surface.

A wiper device 90 is provided on the rear window panel 78 which cleans and removes water from both the tailgate side window panel 48 and the sub-door side window panel 68 by moving thereon as indicated by imaginary lines shown in FIG. 2. This wiper device 90 operates to move over both the tailgate side window panel 48 and the sub-door side window panel 68 so as to clean and remove water therefrom. Hereinafter, the "wiper device 90" will be referred to as a "rear wiper 90" as required.

The tailgate 40 is mounded at a rear portion of the vehicle body 25 so as to swing about a first opening and closing axis L1 that extends in a horizontal direction at an upper portion of the vehicle body 25. The tailgate 40 swings up and down in the vertical direction.

An electrically unlockable tailgate latch device 41 (a tailgate lock means 41) is mounted at a lower end of the tailgate 40 for locking the tailgate 40 with the vehicle body. The tailgate latch device 41 is a known latch device that is locked (is put in a latched state) by being engaged with a tailgate striker 31 that is mounted at a center of a lower edge 30*d* of the rear opening 30.

The tailgate latch device 41 is released from the locked state by a tailgate handle 43 that is provided on a rear surface portion 40*a* of the tailgate 40.

A center line C3 that extends vertically at a width center of the sub-door opening 50 is offset to the left with respect to the center line C2 that extends vertically at the center of the vehicle. Namely, the center line C3 of the sub-door opening 50 is positioned at a portion that is offset to the front passenger's seat side with respect to the center line C2 that extends vertically at the vehicle width center.

A right edge portion 50*b* of the sub-door opening 50 (a side edge portion on the driver's seat side) is positioned closer to the driver's seat side than the vehicle width center C2. A pillar 44 that supports the sub-door 60 extends in the vertical direction along the right edge portion 50*b* of the sub-door opening 50.

Two hinges 45, 45 that support the sub-door 60 so as to rotate in the horizontal direction are mounted on a thick portion 44*b* of the pillar 44 that is positioned lower than the rear window panel 78.

The sub-door 60 is supported on the pillar 44 via the two hinges 45, 45 and is configured as a so-called laterally opening door. An axis that passes a center between the two hinges 45 to extend in a perpendicular direction is referred to as a second opening and closing axis L2, and the sub-door 60 swings about this second opening and closing axis L2. The sub-door 60 swings in a front-rear direction of the vehicle body 25 and in the horizontal direction. A this time, the sub-door 60 opens from the other end portion (a side of the rear opening 30 that faces a left side edge 30*c*) that is opposite to the driver's seat side.

An electrically unlockable sub-door latch device 61 (a sub-door lock means) is mounted at a front passenger's seat side end portion of the sub-door 60 to lock the sub-door 60 with the vehicle body. The sub-door latch device 61 is a known latch device that is locked (is put in a latched state) by being engaged with a sub-door striker 51 that is mounted on a left side edge 50*c* of the sub-door opening 50.

A handle garnish 66 (a garnish 66) is attached so as to extend from the front passenger's seat side end portion of the sub-door 60 towards the vehicle width center C2. The handle garnish 66 supports a sub-door outer handle 63 (a sub-door unlocking device 63) by which the sub-door 60 is opened.

Although there will be described in detail later, a sub-door inner handle (denoted by reference numeral 64 in FIG. 8) by which the sub-door 60 is opened is further disposed on an inner side surface portion of the sub-door 60. Namely, the two handles, the sub-door outer handle 63 and the sub-door inner handle, are mounted on the sub-door 60.

A lock switch 67 is disposed in the sub-door 60 between the sub-door outer handle 63 and the tailgate handle 43, and this lock switch 67 is used not only to lock or unlock the tailgate 40 but also to lock or unlock the sub-door 60. A single lock switch 67 is disposed.

Here, locking or unlocking the tail gate 40 and the sub-door 60 by operating the lock switch 67 refers to making the tailgate handle 43, the sub-door outer handle 63 and the sub-door inner handle operable or inoperable. Namely, when the lock switch 67 is operated to lock the tailgate 40, even though the tailgate handle 43 is operated, the tailgate latch device 41 is not activated. On the contrary, when the lock switch 67 is operated to unlock the tailgate 40, the tailgate latch device 41 is activated by operating the tail gate handle 43. This will be true with the sub-door latch device.

A known mechanism is adopted as a mechanism of switching between locking and unlocking by pressing the lock switch 67.

A lower side 78*d* of the rear window panel 78 is configured by a driver's seat side horizontal portion 81*a* that extends substantially horizontally from a driver's seat side end portion to the vehicle width center C2, an inclined edge 81*b* that extends along a downward gradient from the vehicle width center C2 towards a front passenger's seat side end portion, and a front passenger's seat side horizontal portion 81*c* (an another seat side horizontal portion 81*c*) that extends from a lower end of the inclined edge 81*b* to the front passenger's seat side end portion. By adopting this configuration, in the lower side 78*d* of the rear window panel 78, the front passenger's seat side deviates further downwards than the driver's seat side.

The driver's seat side horizontal portion 81*a* of the lower side 78*d* of the rear window panel 78 is configured by a part of a lower side of the sub-door side window panel 68 and a lower side of the tailgate side window panel 48. The inclined edge 81*b* and the front passenger's seat side horizontal portion 81*c* are configured by the remaining portion of the lower side of the sub-door side window panel 68.

The wiper device 90 includes a pivot shaft 91 that is positioned closer to a driver's seat 15 side than the vehicle width center C2, a wiper arm 92 that extends from the pivot shaft 91 transversely outwards and downwards and a blade 93 that extends vehicle width outwards in the horizontal direction from a distal end of the wiper arm 92. As shown in FIG. 2, in a state where the wiper device 90 is stopped, the blade 93 stays stationary above the front passenger's seat side horizontal portion 81c of the rear window panel 78 while extending therealong. This position is referred to as a stop position.

In the vehicle 10 of the present invention, when it is determined that the sub-door 60 is closed, the tailgate 40 can be opened, and when it is determined that the tailgate 40 is closed, the sub-door 60 can be opened. Hereinafter, this will be described in detail.

Figure 4:
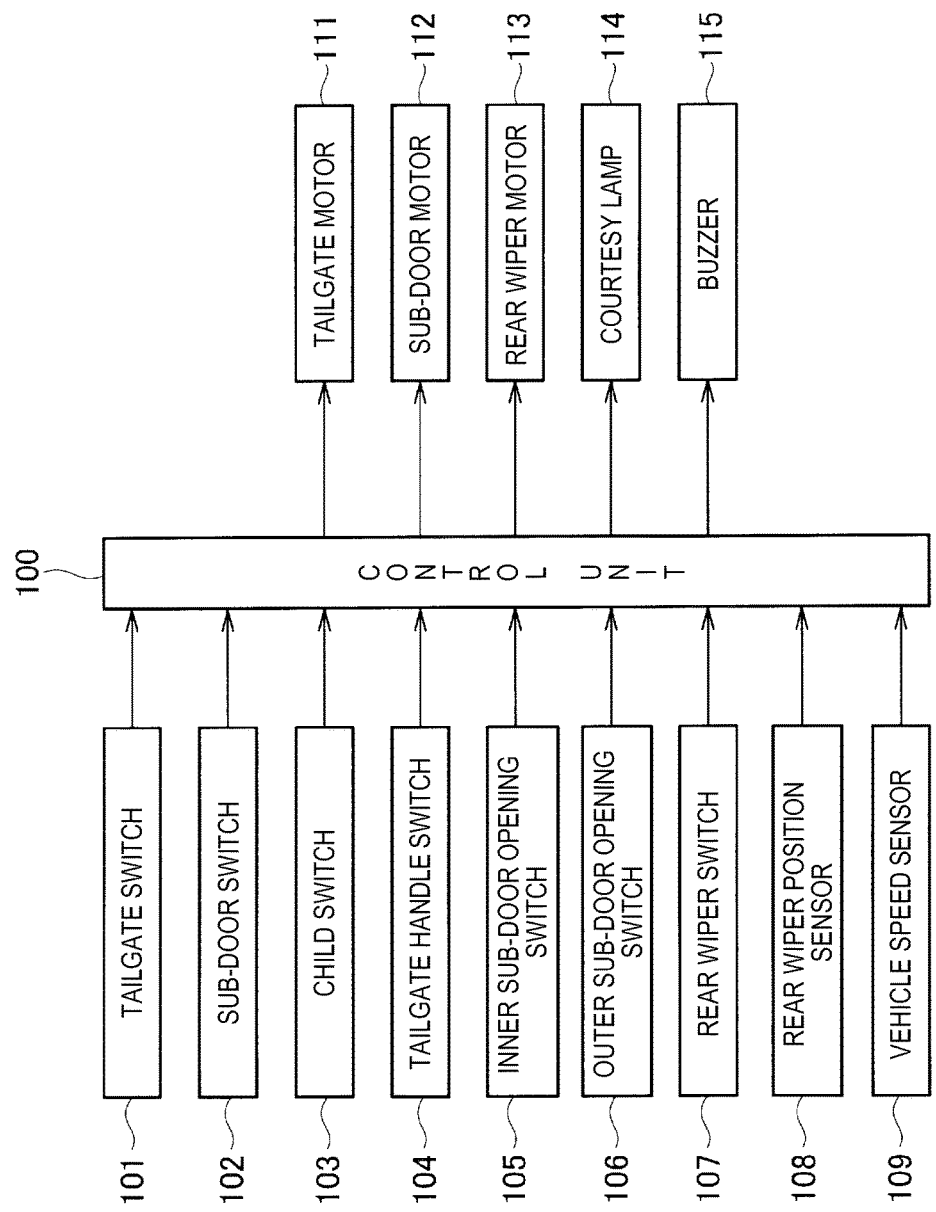
FIG. 4 is a schematic view showing a control system of the vehicle shown in FIG. 2.

As shown in FIGS. 3 and 4, the vehicle 10 has a control unit 100 that controls operations of the tailgate 40, the sub-door 60 and the rear wiper 90.

This control unit 100 receives detection signals from a tailgate switch 101 (a tailgate detecting unit 101) that detects that the tailgate 40 is in a closed state, a sub-door switch 102 (a sub-door detecting unit 102) that detects that the sub-door 60 is in a closed state, a child switch 103 that prohibits the sub-door 60 from being opened from a passenger compartment side when switched on, a tailgate handle switch 104 that detects that the tailgate handle 43 is operated, an inner sub-door opening switch 105 (a sub-door unlocking operation detecting unit 105) that detects that the sub-door inner handle (denoted by reference numeral 64 in FIG. 10) is operated, an outer sub-door opening switch 106 (a sub-door unlocking operation detecting unit 106) that detects that the sub-door outer handle 63 is operated, a rear wiper switch 107 (a wiper stop detecting unit 107) that detects that the rear wiper 90 steps, a rear wiper position sensor 108 (a wiper position detecting unit 108) that detects that the blade 93 of the rear wiper 90 stays in the stop position, and a vehicle speed sensor 109 (a running detecting unit 109) that measures a vehicle speed of the vehicle 10.

On the other hand, the control unit 100 controls a tailgate motor 111 that activates the tailgate latch device 41 to operate, a sub-door motor 112 that activates the sub-door latch device 61 to operate, a rear wiper motor 113 that activates the blade 93 of the rear wiper 90 to swing, a courtesy lamp 114 that illuminates near the sub-door 60, and a buzzer 115 (a warning means 115) that emits a warning sound based on the detection signals.

In addition to the buzzer 115 that is means for emitting a warning in an auditory fashion, means like a lamp that emits a warning in a visual fashion can be adopted as the warning means. Further, both the auditory means and the visual means may be adopted together. Furthermore, the warning means may be mounted not only in the vicinity of the tailgate 40 but also in the vicinity of the driver's seat (for example, as an integral part of the instrumentation). Namely, the warning means can be mounted in an arbitrary location, and hence, where to locate the warning means is not limited to those locations.

Figure 5:
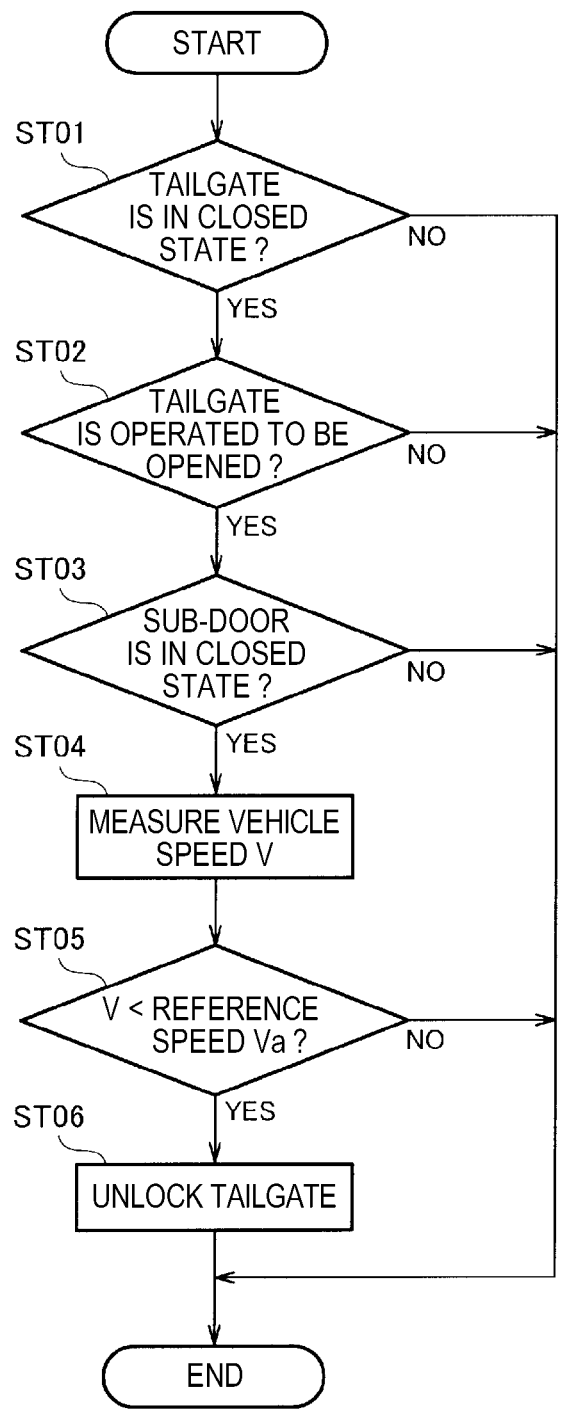
FIG. 5 is a flowchart showing opening conditions of a tailgate shown in FIG. 2.

Referring to FIGS. 3 to 5, conditions will be described under which the tailgate is opened. Firstly, the control unit 100 determines whether the tailgate 40 is closed based on the detection signal from the tailgate switch 101 (Step 01. Hereinafter, "Step" will be written as "ST".). The control unit 100 determines that the tailgate 40 is closed only when the tailgate is in a fully latched state. Namely, the control unit 100 determines that the tailgate 40 is opened when the tailgate is in a half latched state.

If the control unit 100 determines that the tailgate 40 is closed, the control unit 100 determines whether the tailgate 40 is operated to be opened based on the detection signal from the tailgate handle switch 104 (ST02).

If the control unit 100 determines that the tailgate 40 is operated to be opened, the control unit 100 determines whether the sub-door 60 is closed based on the detection signal from the sub-door switch 102 (ST03). The control unit 100 determines that the sub-door 60 is closed when the sub-door 60 is fully latched and in a half latched state.

If the control unit 100 determines that the sub-door 60 is closed, the control unit 100 measures a vehicle speed V by the vehicle speed sensor 109 and determines whether the vehicle speed V is slower than a reference speed Va (ST05).

If the control unit 100 determines that the vehicle speed V is slower than the reference speed Va, the control unit 100 controls the tailgate motor 111 so as to unlock the latch of the tailgate 40 (ST06).

Accordingly, the tailgate latch device 41 is released from the locking on the tailgate striker 31, and the tailgate 40 is opened.

Namely, the tailgate 40 is opened if the tailgate handle 43 is operated to open the tailgate 40, the sub-door 60 is closed, and the vehicle speed is slower than a predetermined speed.

If it is determined in ST02 that the tailgate handle 43 is not operated, if it is determined in ST03 that the sub-door 60 is opened, or if it is determined in ST05 that the vehicle speed V is equal to or faster than the reference speed Va, the control unit 100 ends the control. Namely, the tailgate 40 is prohibited from being opened under any of those conditions, and hence, the tailgate 40 is not opened. This prevents the sub-door 60 from being opened at the same time when the tailgate 40 is opened. Thus, it can be said that with this vehicle 10, the operations of the doors can be performed accurately.

In addition, when the sub-door 60 is in the half latched state, then, the control unit 100 determines that the sub-door 60 is closed. When the tailgate 40 is opened, a force is exerted on the sub-door 60 in a direction in which the sub-door 60 is closed by means of its own weight. By regarding the sub-door 60 as being in the closed state to permit the tailgate 40 to be opened, the conditions under which the tailgate 40 can be opened can be expanded, thereby improving the operability of the tailgate 40.

Further, the electrically unlockable tailgate latch device 41 is provided on the tailgate 40. The tailgate 40 can simply be prohibited from being unlocked through a control to prohibit the operation of the motor for the electrically unlockable latch. This can simplify the configuration to thereby reduce the production costs.

Figure 6:
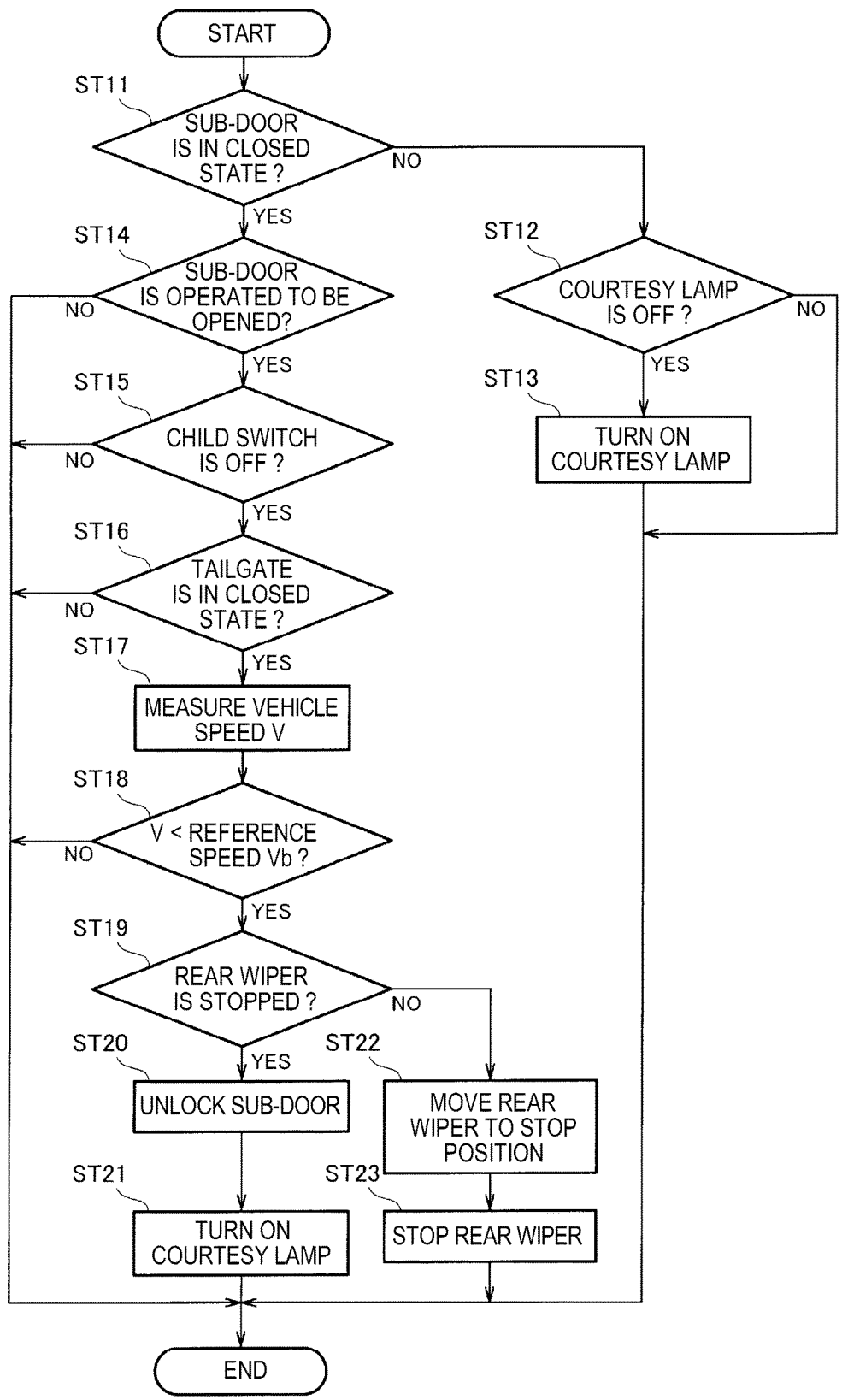
FIG. 6 is a flowchart showing opening conditions of a sub-door shown in FIG. 2.

The opening of the sub-door 60 will be described based on FIGS. 3, 4 and 6. Firstly, the control unit 100 determines based on the detection signal from the sub-door switch 102 whether the sub-door 60 is closed (ST11).

If the control unit 100 determines that the sub-door 60 is not closed, that is, if the sub-door 60 is opened, the control unit 100 determines whether the courtesy lamp 114 is turned off (ST12). If the control unit 100 determines that the courtesy lamp 114 is turned off, the control unit 100 turns on the courtesy lamp 114 and ends the control (ST13), whereas if the courtesy lamp 114 is turned on, the control unit 100 ends the control.

If it is determined in ST11 that the sub-door 60 is closed, the control unit 100 determines whether the sub-door 60 is operated to be opened based on the detection signal from the inner sub-door opening switch 105 or the outer sub-door opening switch 106 (ST14).

If it is determined that the inner sub-door opening switch 105 or the outer sub-door opening switch 106 is operated, the control unit 100 determines whether the child switch 103 is switched off based on the detection signal from the child switch 103 (ST15).

If the control unit 100 determines that the child switch 103 is off, the control unit 100 determines whether the tailgate 40 is closed based on the detection signal from the tailgate switch 101 (ST16). If it is determined that the tailgate 40 is closed, the control unit 100 measures a vehicle speed V by the vehicle speed sensor 109 (ST17) and then determines whether the vehicle speed V is slower than a reference speed Vb (ST18).

If it is determined that the vehicle speed V is slower than the reference speed Vb, the control unit 100 determines whether the rear wiper 90 stops based on the detection signal from the rear wiper switch 107 (ST19). If it is determined that the rear wiper 90 stops, the control unit 100 controls the sub-door motor 112 to unlock a latch of the sub-door 60 (ST20).

Accordingly, the sub-door latch device 60 is released from the locking on the sub-door striker 51, whereby the sub-door 60 is opened. The control unit 100 turns on the courtesy lamp 114 (ST21) and then ends the control.

Namely, if it is determined that the sub-door outer handle 63 or the sub-door inner handle is operated, that the child switch 103 is switched off, that the tailgate 40 is closed, that the vehicle speed is slower than the predetermined speed and that the rear wiper 90 stops, the sub-door 60 is opened.

If it is not determined that the sub-door outer handle 63 or the sub-door inner handle is operated in ST14, that the child switch 103 is switched off in ST15, that the tailgate 40 is closed in ST16 or that the vehicle speed V is slower than the reference speed Vb in ST18, the control unit 100 ends the control. Namely, in any of these conditions, the opening of the sub-door 60 is prohibited, and the sub-door 60 is not opened.

If it is not determined that the rear wiper 90 stops in ST19, that is, when the rear wiper 90 is operating, the control unit 100 controls the rear wiper motor 113 to move the blade 93 of the rear wiper 90 to the stop position (ST22).

The control unit 100 controls the rear wiper motor 113 to stop when the blade 93 of the rear wiper 90 moves to the stop position to thereby stop the rear wiper 90 (ST23) and ends the control. The control unit 100 determines whether the blade 93 stays in the stop position based on the detection signal from the rear wiper position sensor 108.

When the control ends from ST23, since ST11 to ST18 are all satisfied, after the rear wiper 90 stops, by operating the sub-door outer handle 63 or the sub-door inner handle, the control unit 100 controls the sub-door motor 112 to unlock the latch of the sub-door 60 (ST20). At this time, the rear wiper 90 can be stopped without performing a switching-off operation of the rear wiper 90, and the sub-door 60 can be opened.

Thus, as described above, when determining that the tailgate 40 is opened, the control unit 100 controls the sub-door latch device 61 to prohibit the sub-door 60 from being opened. Accordingly, when opening the sub-door 60, the tailgate 40 is prevented from being opened at the same time. With this vehicle 10, the operations of the doors can be performed accurately.

Further, the electrically unlockable sub-door latch device 61 is provided on the sub-door 60. The sub-door 60 can be easily prohibited from being unlocked through a control to prohibit the operation of a motor for an electrically unlockable latch. This can simplify the configuration to thereby reduce the production costs.

When the tailgate 40 is in the half latched state, the control unit 100 determines that the tailgate 40 is opened. When operating the sub-door 60 to open, a force is also exerted on the tailgate 40 in a direction in which the tailgate 40 is opened. The opening of the tailgate 40 is prevented in an ensured fashion by regarding the half latched state as an open state to prohibit the opening of the sub-door 60.

The function of the vehicle 10 will be described in FIGS. 7 and 8.

Figure 7:
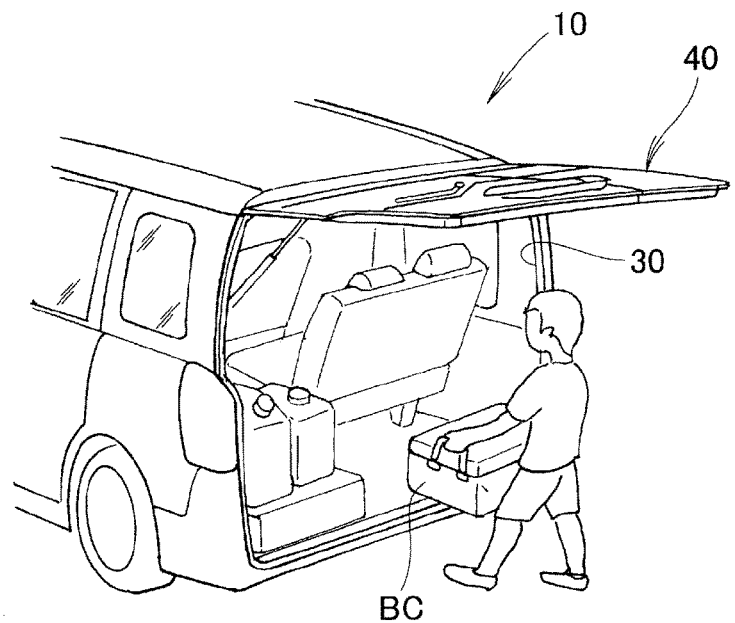
FIG. 7 is a view showing a state in which the tailgate shown in FIG. 2 is opened.

As shown in FIG. 7, when loading a large piece of luggage BC in the vehicle 10, the tailgate 40 is swung upwards. Since the rear opening 30 is opened to a full extent of the rear surface of the vehicle 10, the large piece of luggage BC can easily be loaded in the vehicle 10.

Figure 8:
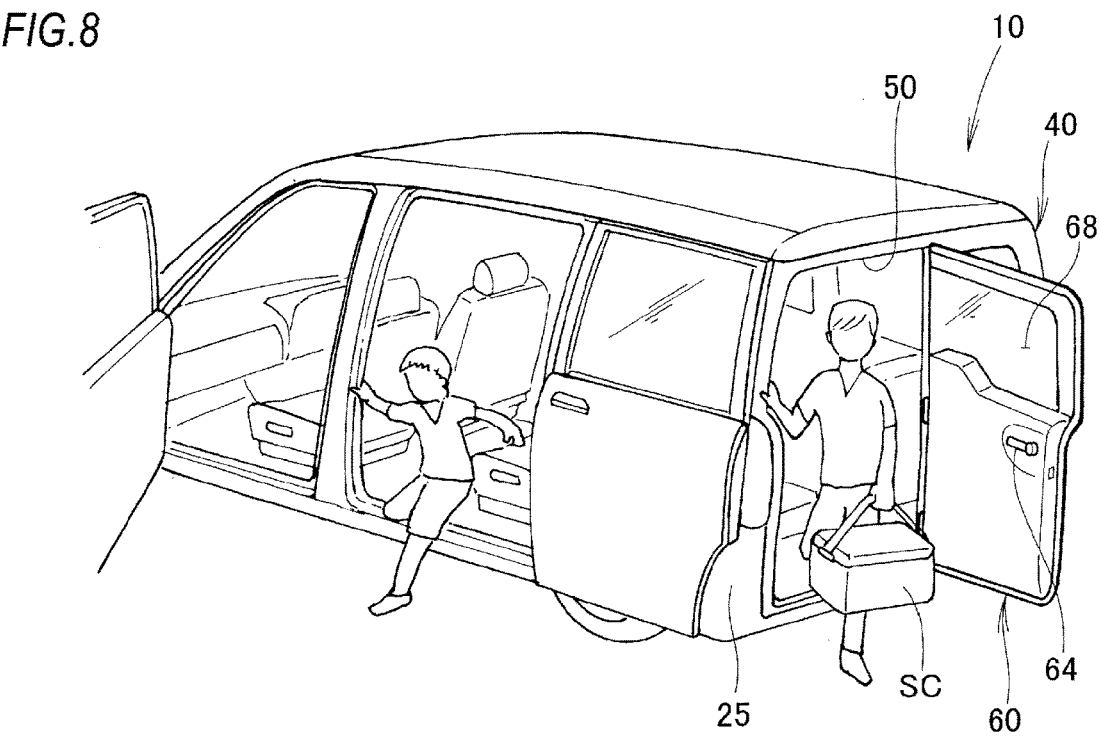
FIG. 8 is a view showing a state in which the sub-door shown in FIG. 2 is opened.

As shown in FIG. 8, the sub-door opening 50 configures a part of the tailgate 40 in the vehicle width direction and is opened to a substantially full extent in the height direction. By using the sub-door opening 50, the occupant can enter and exit from the interior of the vehicle 10 from the rear portion thereof.

In particular, the sub-door inner handle 64 (the sub-door unlocking means 64) that can unlock the sub-door latch device (denoted by reference numeral 61 in FIG. 3) is provided on an inner surface of the sub-door 60. The sub-door inner handle 64 is disposed on an opening end side of the sub-door 60. By providing the sub-door inner handle 64, the sub-door 60 can be opened and closed by operating the sub-door inner handle 64 from the passenger compartment side, whereby the occupant can get off from the rear portion of the vehicle body 25. Namely, the enter/exit capability is enhanced by the occupant being allowed to get off the vehicle by operating the sub-door inner handle 64 from the inside of the passenger compartment.

In addition, when loading a small piece of luggage SC in the vehicle 10, the sub-door 60 is swung in the horizontal direction. The sub-door 60 starts opening from a vehicle width end portion side (denoted by reference numeral 50c in FIG. 3) of the sub-door opening 50. Since the sub-door 60 configures a part of the tailgate 40, the sub-door 60 is lighter in weight than the tailgate 40. Since the sub-door 60 is lighter than the tailgate 40, the sub-door 60 can easily be operated to be opened or closed, resulting in a superior operability.

Embodiment 2

Next, Embodiment 2 of the present invention will be described based on the drawing.

Figure 9:
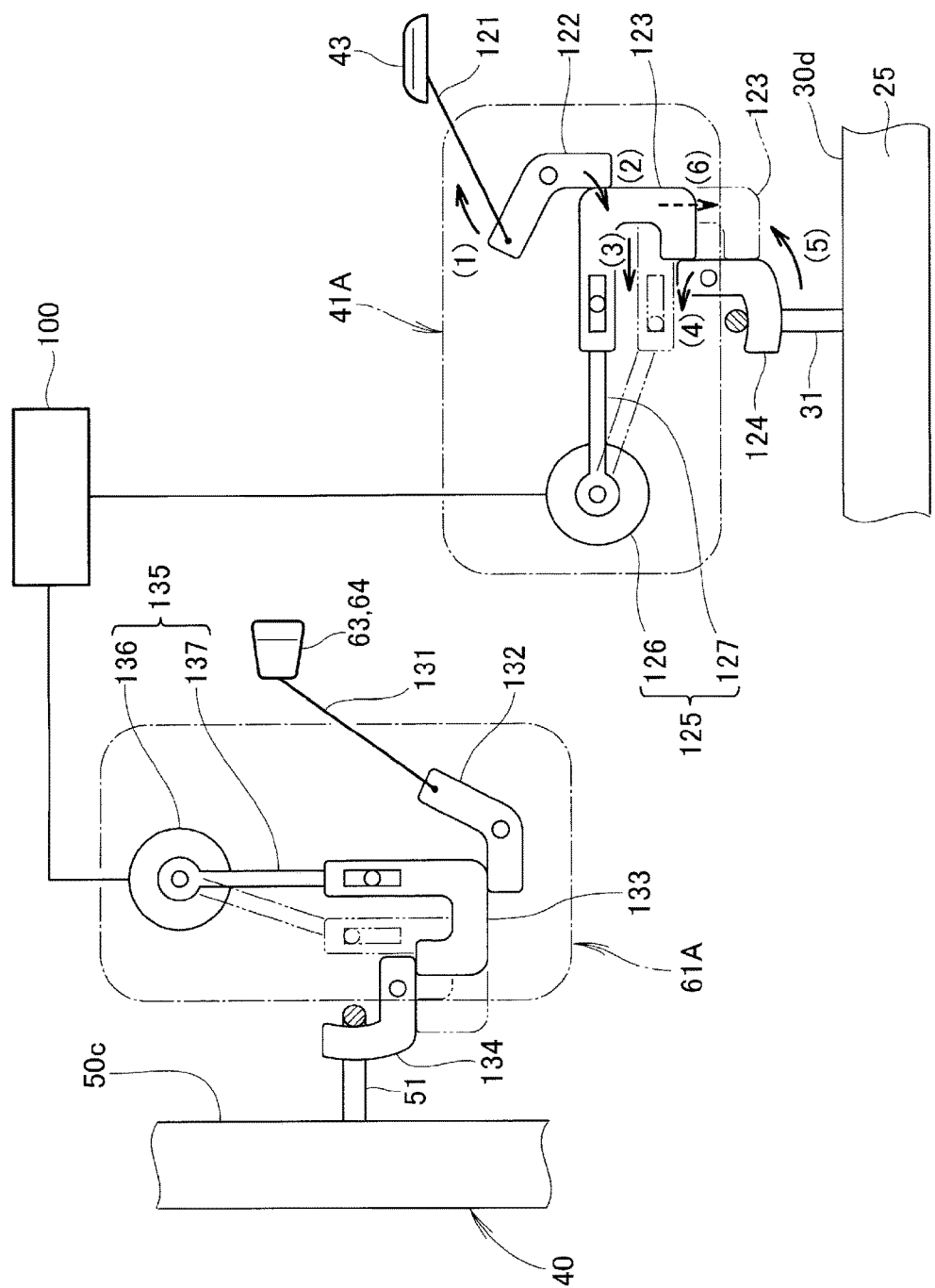
FIG. 9 is a schematic view showing a mechanical latch device mounted on a vehicle with a tailgate according to Embodiment 2 of the present invention.

FIG. 9 shows a mechanical latch device that is mounted on a vehicle according to Embodiment 2. Namely, compared with the vehicle according to Embodiment 1, a different latch device is mounted on the vehicle according to Embodiment 2. The other configurations are the same as those of Embodiment 1. Hence, similar reference numerals will be given to similar constituent components, and the description thereof will be omitted here.

A mechanical latch device is adopted for a tailgate latch device 41A. The tailgate latch device 41A is configured by a tailgate wire 121 (a connecting member 121) that is connected to a tailgate handle 43 at one end thereof, a tailgate side rotary member 122 to which the other end of the tailgate wire 121 is connected and which rotates as a result of the tailgate wire 121 being pulled, a tailgate side transmission member 123 that is provided so as to be brought into contact with the tailgate side rotary member 122 and which can transmit a rotation force of the tailgate side rotary member 122, a tailgate latch 124 that is brought into contact with the tailgate side transmission member 123 to thereby be rotated by the tailgate side transmission member 123, and a tailgate side lock device 125 that can move the tailgate side transmission member 123 from a position where the tailgate side transmission member 123 is allowed to contact the tailgate side rotary member 122 to a position where the tailgate side transmission member 123 is prevented from contacting the tailgate side rotary member 122.

The tailgate side lock device 125 is configured by a tailgate side lock motor 126 that is controlled by a control unit 100 and a tailgate side rod 127 that is fixed to the tailgate side lock motor 126 at one end and is connected to the tailgate side transmission member 123 at the other end thereof. The tailgate side rod 127 swings as a result of the tailgate side lock motor 126 being operated.

In a connected state (an unlocked state) of the tailgate wire 121 with the tailgate latch 124 that is indicated by solid lines in FIG. 9, when a tailgate handle 43 is operated to be pulled, the tailgate wire 121 is pulled as a result of a swinging operation of the tailgate handle 43. This rotates the tailgate side rotary member 122 as indicated by arrows (1) and (2). Then, the tailgate side transmission member 123 moves in a straight line so as to push the tailgate latch 124 as indicated by an arrow (3). The tailgate latch 124 that is pushed by the tailgate side transmission member 123 to rotate is released from a locked state on the tailgate striker 31, as indicated by arrows (4) and (5).

On the other hand, in a connection released state (a locked state) of the tailgate wire 121 with the tailgate latch 124 that is indicated partially by imaginary lines, the tailgate side transmission member 123 is moved to the position where the tailgate side transmission member 123 is prevented from contacting the tailgate side rotary member 122 by the tailgate side lock device 125. Therefore, even though the tailgate handle 43 is operated to be pulled, causing the tailgate side rotary member 122 to rotate, since the tailgate side rotary member 122 is not in contact with the tailgate side transmission member 123, the tailgate side rotary member 122 rotates idly. Namely, even though the tailgate handle 43 is operated, the tailgate 41 cannot be opened.

This will also be true with a sub-door latch device 61A. Namely, a mechanical latch device is adopted for the sub-door latch device 61A. The sub-door latch device 61A is configured by a sub-door wire 131 (a connecting member 131) that is connected to a sub-door outer handle 63 or a sub-door inner handle 64 at one end thereof, a sub-door side rotary member 132 to which the other end of the sub-door wire 131 is connected and which rotates as a result of the sub-door wire 131 being pulled, a sub-door side transmission member 133 that is provided so as to be brought into contact with the sub-door side rotary member 132 and which can transmit a rotation force of the sub-door side rotary member 132, a sub-door latch 134 that is brought into contact with the sub-door side transmission member 133 to thereby be rotated by the sub-door side transmission member 133, and a sub-door side lock device 135 that moves the sub-door side rotary member 133 from a position where the sub-door side rotary member 133 is allowed to contact the sub-door side rotary member 132 to a position where the sub-door side transmission member 133 is prevented from contacting the sub-door side rotary member 132.

The sub-door side lock device 135 is configured by a sub-door side lock motor 136 that is controlled by the control unit 100 and a sub-door side rod 137 that is fixed to the sub-door side lock motor 136 at one end and is connected to the sub-door side transmission member 133 at the other end thereof. The function of the sub-door latch device 61A is similar to that of the tailgate latch device 41A, and hence, the description thereof will be omitted here.

When either of the tailgate 40 and the sub-door 60 is unlocked, the control unit 100 controls the lock devices 125, 135 so as to lock the other of the tailgate 40 and the sub-door 60. The operation of the other of the tailgate 40 and the sub-door 60 can be prohibited by activating the lock devices 125, 135 to operate.

By activating the lock devices 125, 135, which are originally required to release the operation force from the handles 43, 63, 64, to operate on the locking side, the operation of the other of the tailgate 40 and the sub-door 60 can be prohibited without adding a new mechanism (device), thereby making it possible to prevent an increase in the production costs.

In the embodiments, the right-hand drive station wagon is described as an example, however, the present invention can also be applied to a left-hand drive station wagon as well as a bus other than the station wagons. Namely, the embodiments that have been described are only the examples of the present invention, and the present invention is not limited to those types of vehicles as long as the functions and advantages described herein can be provided.

Further, the sub-door 60 may be determined as being closed only when the sub-door 60 is fully latched.

INDUSTRIAL APPLICABILITY

The vehicle with a tailgate of the present invention is preferable for use for a station wagon.

DESCRIPTION OF REFERENCE NUMERALS 10 vehicle with tailgate
25 vehicle body
30 rear opening
40 tailgate
41 (electrically unlockable) tailgate latch device
41A (mechanical) tailgate latch device
43 tailgate handle (handle for opening tailgate)
50 sub-door opening
60 sub-door
61 (electrically unlockable) sub-door latch device
61A (mechanical) sub-door latch device
63 sub-door outer handle (handle for opening sub-door)
64 sub-door inner handle (handle for opening sub-door)
100 control unit
121 tailgate wire (connecting member)
125 tailgate side lock device (lock device)
135 sub-door side lock device (lock device)

The invention claimed is:

1. A vehicle with a tailgate in which a rear opening is formed in a rear surface of a vehicle body, a tailgate is provided to open and close the rear opening, a sub-door opening is formed in a portion of the tailgate in a width direction, and a sub-door is provided to open and close the sub-door opening, the vehicle comprising:
 a tailgate latch device configured to lock the tailgate with the vehicle body;
 a sub-door latch device configured to lock the sub-door with the vehicle body; and
 a control unit configured to control the tailgate latch device and the sub-door latch device,
 wherein the control unit is configured to control the tailgate latch device so as to prohibit the tailgate from being opened when determining that the sub-door is opened, and
 wherein the control unit is configured to determine that the sub-door is closed when the sub-door is in a half-latched state.

2. A vehicle with a tailgate in which a rear opening is formed in a rear surface of a vehicle body, a tailgate is provided to open and close the rear opening, a sub-door opening is formed in a portion of the tailgate in a width direction, and a sub-door is provided to open and close the sub-door opening, the vehicle comprising:
- a tailgate latch device configured to lock the tailgate with the vehicle body;
- a sub-door latch device configured to lock the sub-door with the vehicle body; and
- a control unit configured to control the tailgate latch device and the sub-door latch device,
- wherein the control unit is configured to control the sub-door latch device so as to prohibit the sub-door from being opened when determining that the tailgate is opened, and
- wherein the control unit is configured to determine that the sub-door is closed when the sub-door is in a half-latched state.

3. The vehicle with a tailgate according to claim 1, wherein an electrically unlockable latch device is adopted for each of the tailgate latch device and the sub-door latch device.

4. The vehicle with a tailgate according to claim 1, wherein:
- at least one of the tailgate latch device and the sub-door latch device is a mechanical latch device,
- a latch of the one of the latch device is connected with a handle with which an opening operation is performed via a connecting member,
- the latch device includes a lock device which can unlock the connecting of the connecting member with the latch,
- the lock device is controlled by the control unit to be in either of a locking state and an unlocking state, and
- the control unit locks one of the tailgate or the sub-door when the other of the tailgate or the sub-door is opened.

5. The vehicle with a tailgate according to claim 1, wherein the control unit determines that the tailgate is opened when the tailgate is in a half-latched state.

6. The vehicle with a tailgate according to claim 2, wherein an electrically unlockable latch device is adopted for each of the tailgate latch device and the sub-door latch device.

7. The vehicle with a tailgate according to claim 2, wherein:
- at least one of the tailgate latch device and the sub-door latch device is a mechanical latch device,
- a latch of the one of the latch device is connected with a handle with which an opening operation is performed via a connecting member,
- the latch device includes a lock device which can unlock the connecting of the connecting member with the latch,
- the lock device is controlled by the control unit to be in either of a locking state and an unlocking state, and
- the control unit locks one of the tailgate or the sub-door when the other of the tailgate or the sub-door is opened.

8. The vehicle with a tailgate according to claim 2, wherein the control unit determines that the tailgate is opened when the tailgate is in a half-latched state.

9. The vehicle with a tailgate according to claim 3, wherein the control unit determines that the tailgate is opened when the tailgate is in a half-latched state.

10. The vehicle with a tailgate according to claim 4, wherein the control unit determines that the tailgate is opened when the tailgate is in a half-latched state.

* * * * *